United States Patent [19]

Ward

[11] 3,930,554

[45] Jan. 6, 1976

[54] POWER-ASSISTED STEERING GEAR

[75] Inventor: Benjamin Ward, Droitwich, England

[73] Assignee: Borman & Sons Limited, Birmingham, England

[22] Filed: Sept. 10, 1973

[21] Appl. No.: 395,640

[30] Foreign Application Priority Data
Sept. 8, 1972 United Kingdom............... 41764/72

[52] U.S. Cl............................ 180/79 R; 91/375 A
[51] Int. Cl.²............................................ B62D 5/08
[58] Field of Search................. 180/79.2 R, 79.2 D; 91/375 A, 370, 371, 372, 373

[56] References Cited
UNITED STATES PATENTS

| | | | |
|---|---|---|---|
| 2,826,258 | 3/1958 | Livers | 180/79.2 D |
| 2,893,504 | 7/1959 | Jackson | 180/79.2 D |
| 3,183,992 | 5/1965 | Bruder | 180/79.2 D |
| 3,406,773 | 10/1968 | Luther | 180/79.2 D |
| 3,465,842 | 9/1969 | Hruska | 180/79.2 D |
| 3,692,137 | 9/1972 | Inoue | 180/79.2 D |

*Primary Examiner*—Robert R. Song
*Assistant Examiner*—John A. Pekar
*Attorney, Agent, or Firm*—Holman & Stern

[57] ABSTRACT

A power-assisted steering gear for a road vehicle and of the kind having a fluid-pressure actuated device which is controlled by a valve that is itself actuable in use by the driver of a vehicle in which the steering gear is mounted, the valve incorporating a pair of relatively movable valve members, wherein there are provided means responsive in use to vehicle road speed and means offering resistance to such relative movement of the valve members, with the road speed responsive means being operatively connected to the resistance offering means and being arranged so that in use as the vehicle road speed increases, or at a predetermined vehicle road speed the resistance offered by the resistance offering means to relative movement between the valve members is increased.

4 Claims, 2 Drawing Figures

3,930,554

POWER-ASSISTED STEERING GEAR

BACKGROUND OF THE INVENTION

This invention relates to power-assisted steering gear which is intended for use in road vehicles and which is of the kind including a fluid-pressure actuated device which is controlled by a valve that is itself actuable in use by the driver of a vehicle in which the steering gear is mounted.

The resistance felt by the driver of a road vehicle having a manually operable steering gear as the steering wheel of the vehicle is turned varies from a relatively large resistance when the vehicle is parked or travelling at a very low speed to a relatively small resistance when the vehicle is travelling at high speeds. It is therefore desirable to arrange, if possible, when power-operated assistance is used, that the assistance given to manual operation of the steering gear should similarly vary from a maximum when the vehicle is stationary or travelling at low speeds to a minimum when the vehicle is travelling at high speeds. This desideratum could be achieved for example in an hydraulically actuated steering gear having a hydraulic pump by arranging that the hydraulic pressure available to operate the gear shall decrease as the vehicle road speed increases. Such an arrangement would however result in the disadvantage that at high road speeds the steering would develop, so far as the driver is concerned, a considerable amount of "sloppiness" and in the last resort when the hydraulic pressure had reached a very low or zero value, steering control would be exercised or substantially exercised by a direct mechanical connection through inter-engaging dogs which are normally provided, for safety reaons in the event of loss of hydraulic fluid, on two relatively movable valve members, such dogs however providing a substantial amount of "lost motion" in operating the steering gear.

OBJECT AND SUMMARY OF THE INVENTION

The object of the present invention is to provide an improved form of power-assisted steering gear which possesses the above-mentioned desideratum but without having the disadvantage referred to.

In accordance with the invention there is provided a power-assisted steering gear of the kind including a fluid-pressure actuated device which is controlled by a valve that is itself actuable in use by the driver of a vehicle in which the steering gear is mounted, said valve incorporating a pair of relatively movable valve members, wherein there are provided means responsive in use to vehicle road speed and means offering resistance to such relative movement of the valve members, said road speed responsive means being operatively connected to said resistance offering means and being arranged so that in use as the vehicle road speed increases or at a pre-determined vehicle road speed the resistance offered by said resistance offering means to relative movement between said valve members is increased.

BRIEF DESCRIPTION OF THE DRAWINGS

The invention will now be more particularly described with reference to the accompanying drawings wherein.

DETAILED DESCRIPTION OF THE EMBODIMENTS

Figure 1:
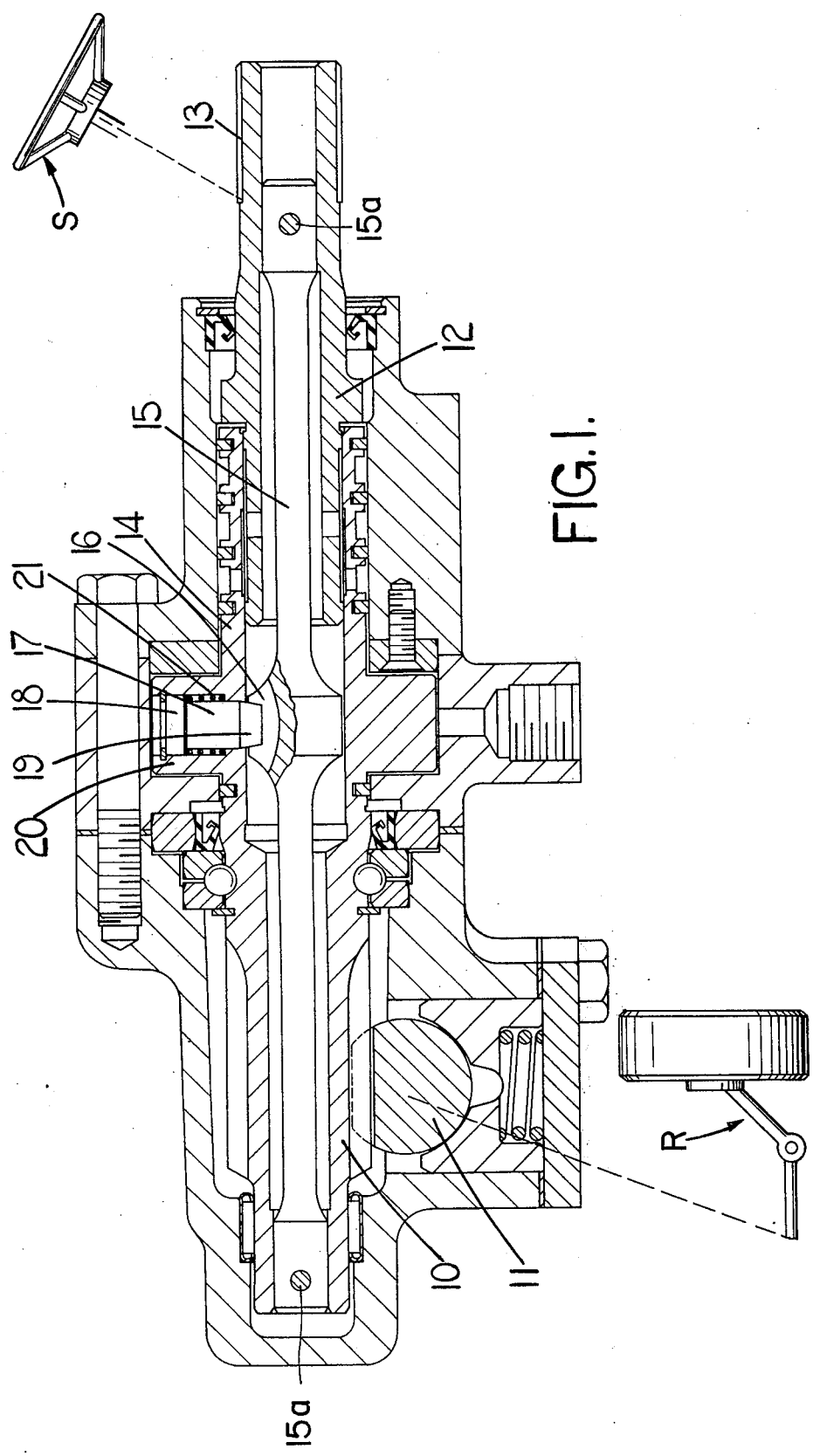
FIG. 1 is a longitudinal sectional view showing one example of a power-assisted steering gear in accordance with the invention.

Referring firstly to FIG. 1, there is shown therein a power-assisted steering gear which is intended for use in a road vehicle and which incorporates a pinion 10 and a rack 11 which is connectible to steerable road wheels R of the vehicle and which is also connected to or forms part of an hydraulic piston and cylinder unit (not shown) arranged to be actuated by pressurized hydraulic fluid which would be supplied, in use, from a pump driven by the engine of the vehicle in which the steering gear is mounted.

For the purpose of directing pressurized fluid into one end or the other of said piston and cylinder unit when it is required to turn the vehicle from a straight course the steering gear is provided with a valve having a pair of relatively movable valve members. The valve members are concentrically arranged and comprise an inner member 12 which is connectible at its outer end 13 to a driver-rotatable shaft having a steering wheel denoted generally S and a sleeve member 14 which forms an extension of said pinion 10. Such relative movement of the valve members consists in the example now described of relative angular movement. Thus, angular movement of the vehicle steering wheel by the driver of the vehicle will result in the associated valve inner member 12 being initially turned relative to the sleeve member 14. The valve members are interconnected by a torsion bar 15 which is pinned at its ends as shown at 15a to the two valve members respectively and which thus provides resistance to the turning movement of said valve inner member 12 connected to the vehicle steering wheel. Such resistance is of course related to the stiffness of said torsion bar 15 and such stiffness depends, inter alia, on the length of said torsion bar.

The torsion bar 15 is provided at some convenient position intermediate its ends, for example, at a position mid-way between its ends, with a recess 16 which extends into the interior of the torsion bar from the exterior thereof, with said recess being of inwardly tapering configuration so as to comprise for example a slot of v-shaped cross-section. Associated with said recess 16 and disposed at a position which is directly opposed to the recess is a plunger 17 having a head 18 and an inner end 19 which is also of tapered configuration, with said plunger being mounted in a housing 20 formed in the valve sleeve member 14 to which a supply of pressurized hydraulic fluid can be conducted (by a port not shown) whereby such fluid can act on the outer side of the head 18 of the plunger to force it inwardly against the pressure exerted by a spring 21 so that its inner end 19 will project into the aforesaid recess 16 formed in the torsion bar. This hydraulic fluid is arranged to be supplied by a further hydraulic pump (not shown) arranged so that the pressure of fluid delivered is dependent upon the road speed of the vehicle. For example, said further pump can be disposed so that it is driven by the output of the gearbox of the vehicle concerned and the arrangement can be such that the hydraulic pressure applied to said plunger 17 gradually increases with vehicle road speed so that the plunger is moved gradually inwardly into the recess 16 in the torsion bar or alternatively the plunger can be moved relatively quickly into said recess when the hydraulic pressure reaches a predetermined value (corresponding to a predetermined road speed) through the operation for example of a suitable pressure lift-off valve which prevents hydraulic pressure being applied to the plunger until a predetermined pressure is reached.

When the inner end of the plunger however does enter fully into the recess 16 in the torsion bar 15 the effect will be that the torsion bar is pinned by said plunger at a position mid-way along its length so that the effective length of the torsion bar will be halved and therefore its stiffness will be substantially increased. Obviously, considerably greater resistance will now be offered to relative movement between the two valve members 12 and 14, with such increased resistance becoming effective at relatively high vehicle road speeds.

Figure 2:
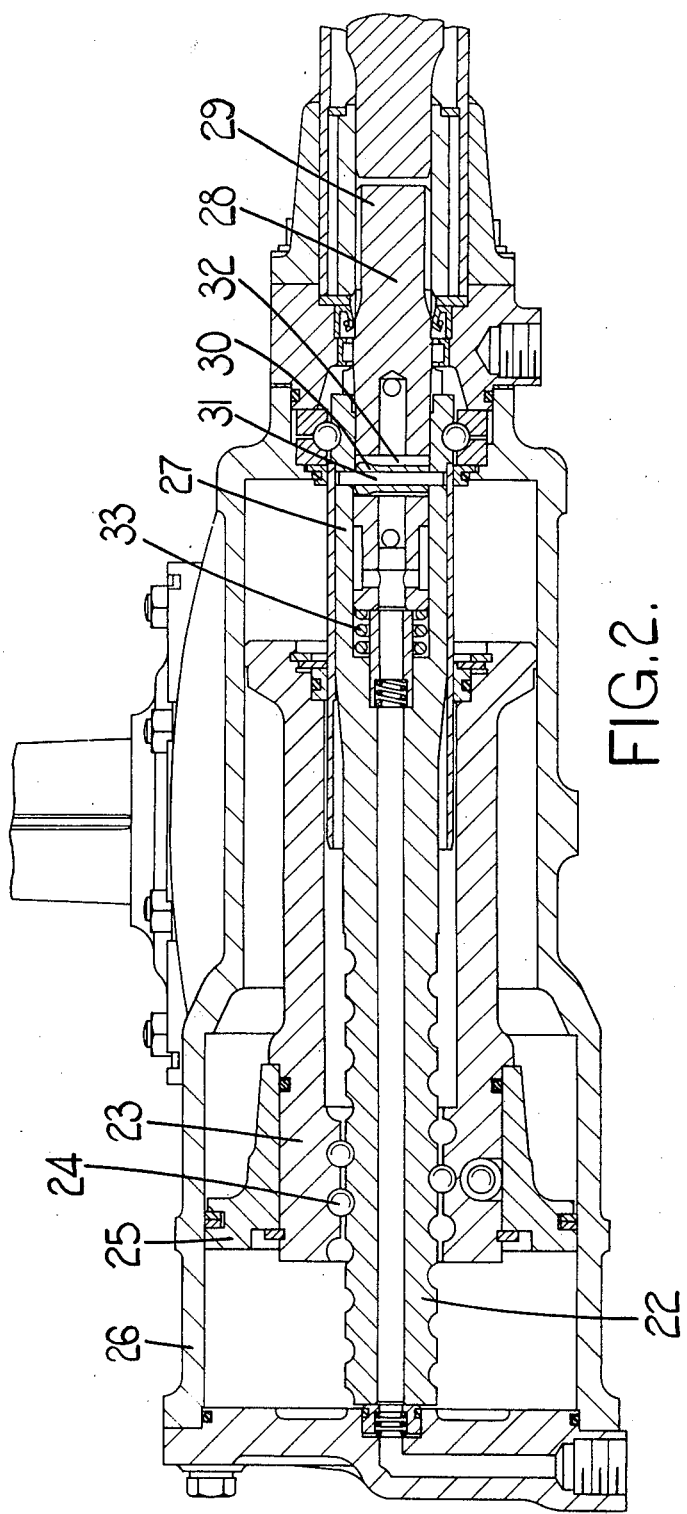
FIG. 2 is a longitudinal sectional view showing another embodiment of a power-assisted steering gear in accordance with the invention.

In the alternative example seen in FIG. 2, the power-assisted steering gear shown therein comprises a worm 22 and nut 23 together with a plurality of re-circulating balls 24. One end of the nut 23 is connected to a piston 25 movable in a cylinder 26 so that the piston and cylinder form a hydraulic unit in which pressurized fluid can be supplied by an engine driven pump provides the required power assistance. Admission of fluid in the cylinder 26 is controlled by a valve having two relatively movable valve members 27 and 28 which are so connected that relative angular movement between the two members also results in a small relative axial movement between the two members. Thus valve member 27 comprises a sleeve like extension of the worm 22 and into said extension projects the inner end of the other valve member 28 which at its outer end 29 is connectible to a driver-rotatable shaft. The valve members 27 and 28 are interconnected by a roller 30 mounted on a pin 31 which is secured to the sleeve like outer member 27 so as to extend across the interior thereof while the roller 30 is disposed within a transverse bore 32 formed in the inner member 28. The bore 32 has a larger diameter than the maximum diameter of the roller 30 and thus relative angular movement between the member 27 and 28 on either side of a neutral position will be accompanied by relative axial movement between said two members 27 and 28. Such relative axial movement will effect the opening and closing of ports (not shown) in the valve which controls the flow of fluid into and out of the piston and cylinder unit 25 and 26. Such axial movement is opposed, inter alia, by a spring 33 which thus offers some resistance to relative rotational movement as well. There is also provided a supply of hydraulic fluid which is delivered under pressure by a further pump (not shown) whose speed is related to the road speed of the vehicle as before, with such fluid being arranged to act on said valve member 27 in order to augment the force exerted by said spring 33. Thus said hydraulic fluid can be arranged to exert a gradually increasing axial pressure on the valve member 27 in order to provide gradually increasing resistance to relative axial and rotational movement between the two valve members or, alternatively, as before, the hydraulic pressure can be arranged to come into operation at a predetermined road speed. In either event, however, the effect will be that at relatively high road speeds there will be an increased resistance to rotational movement between the two valve members 27 and 28 so that minimum power assistance will be given when the vehicle concerned is travelling at relatively high speeds. On the other hand at low or zero speeds the resistance to rotational movement between the two valve members is relatively low and thus maximum power assistance will be provided when the steering wheel is turned.

In either of the above-described examples the pressurized fluid supplied by the hydraulic pump whose output is related to road speed provides of course a means responsive to road speed. However, such means may be provided if desired in other ways such as for example by means of an electric current which can be supplied by means of a generator whose output again depends on road speed, with such current being arranged to actuate for example a solenoid valve which can in turn operate the plunger in the first case above-described or which could apply hydraulic pressure to one axial end of one valve member in the second case described.

I claim:

1. A power assisted steering gear for a road vehicle having steerable wheels and a driver rotatable shaft, including a pressure operated device, valve means controlling said pressure operated device comprising two relatively angularly movable valve members, a torsion bar having opposite ends, means connecting said two valve members to respective opposite ends of said torsion bar, means operably connecting one of such valve members to the driver rotatable shaft, means operably connecting the other of said valve members to the steerable wheels, said torsion bar offering resistance to relative movement of the valve members, said torsion bar having a recess therein intermediate the opposite ends thereof, and a plunger having an inner end, means mounting said plunger on one of said valve members to be normal to the torsion bar and being movable by pressurized fluid, the pressure of which is dependent upon road speed of the vehicle, in a radially inward direction to bring the inner end of the plunger into engagement with the recess in the torsion bar for increasing the stiffness of the torsion bar with increasing road speed of the vehicle.

2. The power assisted steering gear as claimed in claim 1 wherein said recess is formed at the center of the length of the torsion bar.

3. The power assisted steering gear as claimed in claim 1 wherein said recess and the inner end of said plunger have similar tapered configurations.

4. A power assisted steering gear for a road vehicle having steerable wheels and a driver rotatable shaft, including a pressure operated device, valve means controlling said pressure operated device comprising relatively angularly movable inner and sleeve members, a torsion bar having opposite ends, means connecting said inner and sleeve members to respective opposite ends of said torsion bar, means operably connecting said inner member to the driver rotatable shaft, means operably connecting the sleeve member to the steerable wheels, said torsion bar offering resistance to relative movement of the inner and sleeve members, said torsion bar having a recess therein intermediate the opposite ends thereof, said sleeve member having a housing located normal to the torsion bar, and a plunger having an inner end mounted in said housing and being movable by pressurized fluid, the pressure of which is dependent upon road speed of the vehicle, in a radially inward direction to bring the inner end of the plunger into engagement with the recess in the torsion bar for increasing the stiffness of the torsion bar with increasing road speed of the vehicle.

* * * * *